United States Patent
Fischer et al.

(10) Patent No.: US 10,114,843 B2
(45) Date of Patent: Oct. 30, 2018

(54) CONTENT MIGRATION FRAMEWORK

(75) Inventors: Martin P. Fischer, Heidelberg (DE);
Heiko Kiessling, Eppelheim (DE);
Dieter Guendisch, Karlsruhe (DE);
Alexander Rieder, Herxheim (DE);
Achim Weigel, Kaiserslautern (DE);
Paul Goetz, Wiesbaden (DE); Martin Hermes, Muehlhausen (DE); Stephan Klevenz, Heidelberg (DE); Martin Kreyscher, Heidelberg (DE); Corneliu D. Mitu, Rauenberg (DE); Juergen Schneider, Otterstadt (DE); Johannes Weber, Schriesheim (DE)

(73) Assignee: SAP SE, Walldorf (DE)

( * ) Notice: Subject to any disclaimer, the term of this patent is extended or adjusted under 35 U.S.C. 154(b) by 1555 days.

(21) Appl. No.: 13/292,647

(22) Filed: Nov. 9, 2011

(65) Prior Publication Data
US 2013/0117289 A1 May 9, 2013

(51) Int. Cl.
*G06F 17/30* (2006.01)

(52) U.S. Cl.
CPC ...... *G06F 17/303* (2013.01); *G06F 17/30563* (2013.01); *G06F 17/30569* (2013.01)

(58) Field of Classification Search
CPC ............. G06F 17/30893; G06F 17/303; G06F 17/30309; G06F 17/30917; G06F 17/30705; G06F 17/30563; G06F 17/30569
USPC ......... 707/999.204, E17.117, 692, 694, 602, 707/756
See application file for complete search history.

(56) References Cited

U.S. PATENT DOCUMENTS

| | | | |
|---|---|---|---|
| 7,222,142 B2 | 5/2007 | Fisher et al. | |
| 7,457,933 B2 | 11/2008 | Pferdekamper et al. | |
| 7,475,401 B1 | 1/2009 | Frey et al. | |
| 7,490,347 B1 | 2/2009 | Schneider | |
| 7,577,682 B2 | 8/2009 | Mueller et al. | |
| 7,606,893 B2 | 10/2009 | Petrov et al. | |
| 7,620,908 B2 | 11/2009 | Klevenz et al. | |
| 7,640,594 B2 | 12/2009 | Becker et al. | |
| 7,650,609 B2 | 1/2010 | Klevenz et al. | |
| 7,653,667 B2 | 1/2010 | Pferdekamper et al. | |
| 7,657,609 B2 | 2/2010 | Klevenz et al. | |
| 7,676,542 B2 | 3/2010 | Moser et al. | |
| 7,693,881 B2 | 4/2010 | Fisher et al. | |

(Continued)

OTHER PUBLICATIONS

"Data Migration" Wikipedia.org as taken from wikipedia edit archives Oct. 29, 2010.*

*Primary Examiner* — Vincent F Boccio
(74) *Attorney, Agent, or Firm* — Fish & Richardson P.C.

(57) ABSTRACT

The present disclosure involves computer-implemented methods, software, and systems for supporting migration of unstructured data stored in enterprise content management systems. A computer-implemented method includes generating a search for content matching at least one content search rule, receiving a list of matched documents, wherein each document in the list of matched documents is associated with at least a source repository identifier and a unique document identifier, calculating a target repository identifier and at least one metadata change instruction for each unique document identifier using at least one migration rule, and modifying metadata for the document associated with each unique document identifier using the calculated at least one metadata change instruction.

17 Claims, 3 Drawing Sheets

(56) References Cited

U.S. PATENT DOCUMENTS

| | | | |
|---|---|---|---|
| 7,693,890 B2 | 4/2010 | Fisher et al. | |
| 7,707,506 B2 | 4/2010 | Weigel et al. | |
| 7,721,266 B2 | 5/2010 | Frey et al. | |
| 7,739,374 B1 | 6/2010 | Frey et al. | |
| 7,756,813 B2 | 7/2010 | Pferdekamper et al. | |
| 7,756,814 B2 | 7/2010 | Fisher et al. | |
| 7,827,160 B2 | 11/2010 | Kuhr et al. | |
| 7,836,126 B2 | 11/2010 | Thommes et al. | |
| 7,849,048 B2 * | 12/2010 | Langseth | G06F 17/30563 707/912 |
| 7,849,049 B2 * | 12/2010 | Langseth | G06F 17/30563 707/602 |
| 7,894,602 B2 | 2/2011 | Mueller et al. | |
| 7,895,233 B2 | 2/2011 | Weigel et al. | |
| 7,925,641 B2 | 4/2011 | Albrecht et al. | |
| 8,090,754 B2 | 1/2012 | Schmidt et al. | |
| 8,140,866 B2 | 3/2012 | Becker et al. | |
| 8,478,756 B2 | 7/2013 | Heix et al. | |
| 8,484,206 B2 | 7/2013 | Schmidt et al. | |
| 8,510,720 B2 | 8/2013 | Fischer | |
| 8,832,856 B2 | 9/2014 | Fischer | |
| 9,477,749 B2 * | 10/2016 | Mathew | G06F 17/30705 |
| 2005/0125463 A1 * | 6/2005 | Joshi | G06F 17/30917 707/999.204 |
| 2005/0193042 A1 * | 9/2005 | Steinmaier | G06F 17/30286 707/999.204 |
| 2007/0011175 A1 * | 1/2007 | Langseth | G06F 17/30563 707/999.1 |
| 2008/0082547 A1 * | 4/2008 | Hwang | G06Q 10/10 707/999.01 |
| 2008/0154994 A1 | 6/2008 | Fisher et al. | |
| 2008/0243781 A1 | 10/2008 | Kuhr et al. | |
| 2009/0043864 A1 * | 2/2009 | Shetty | H04L 12/66 709/217 |
| 2009/0112916 A1 * | 4/2009 | Stuhec | G06F 17/2247 707/999.102 |
| 2009/0150431 A1 | 6/2009 | Schmidt et al. | |
| 2009/0150906 A1 | 6/2009 | Schmidt et al. | |
| 2009/0192979 A1 * | 7/2009 | Lunde | 707/1 |
| 2010/0095197 A1 | 4/2010 | Klevenz et al. | |
| 2010/0287553 A1 | 11/2010 | Schmidt et al. | |
| 2010/0332480 A1 * | 12/2010 | Verreaux | G06F 17/30575 707/741 |
| 2012/0030180 A1 | 2/2012 | Klevenz et al. | |
| 2013/0117289 A1 | 5/2013 | Fisher et al. | |
| 2014/0222756 A1 | 8/2014 | Schmidt et al. | |

* cited by examiner

CONTENT MIGRATION FRAMEWORK

TECHNICAL FIELD

The present disclosure relates to computer-implemented methods, software, and systems for supporting migration of unstructured data stored in an enterprise content management system.

BACKGROUND

A common problem in enterprise resource planning (ERP) systems is the migration of data following organizational changes in a corporate group. For example, a transaction, such as a purely desired technical migration or the sale/acquisition of a company, may lead to a split or a merge of an entire corporate data set, including both structured and unstructured data, stored in the ERP system. Effective management of the corporate data set is essential for an efficient and cost-effective implementation of the migration or organizational change and to ensure both data integrity and security. When the corporate group is international in scope, international regulations may also complicate the management of the data due to various legal compliance rules for storage, replication, deletion, transfer, and use of the data. While the corporate group may obtain support for the management of the structured data, corresponding support is not available for the management of unstructured data.

SUMMARY

The present disclosure relates to computer-implemented methods, software, and systems for supporting migration of unstructured data stored in enterprise content management systems. One computer-implemented method includes generating a search for content matching at least one content search rule, receiving a list of matched documents, wherein each document in the list of matched documents is associated with at least a source repository identifier and a unique document identifier, calculating a target repository identifier and at least one metadata change instruction for each unique document identifier using at least one migration rule, and modifying metadata for the document associated with each unique document identifier using the calculated at least one metadata change instruction.

While generally described as computer-implemented software embodied on a non-transitory computer readable storage device that processes and transforms respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DETAILED DESCRIPTION

The disclosure generally describes computer-implemented methods, software, and systems for supporting migration of unstructured data stored in enterprise content management systems. Specifically described are computer-implemented methods, software, and systems for supporting migration of unstructured data stored in enterprise content management systems using a migration engine server and a content management integration layer.

Previously, migration of data following changes in a corporate group lead to a split or a merge of an entire corporate data set, including both structured and unstructured data, stored in an ERP system. While the corporate group could obtain support for the management of the structured data, corresponding support was not available for the management of the unstructured data. The advantages of the present disclosure are numerous. First, the migration engine server allows effective management of the complete corporate data set (i.e., both structured and unstructured data). Second, effective management of the complete corporate data set ensures efficient and cost-effective implementation of a change in the corporate group. Further, compliance with international regulations and compliance rules for storage, replication, deletion, transfer, and use of the complete corporate data set is ensured.

Figure 1:
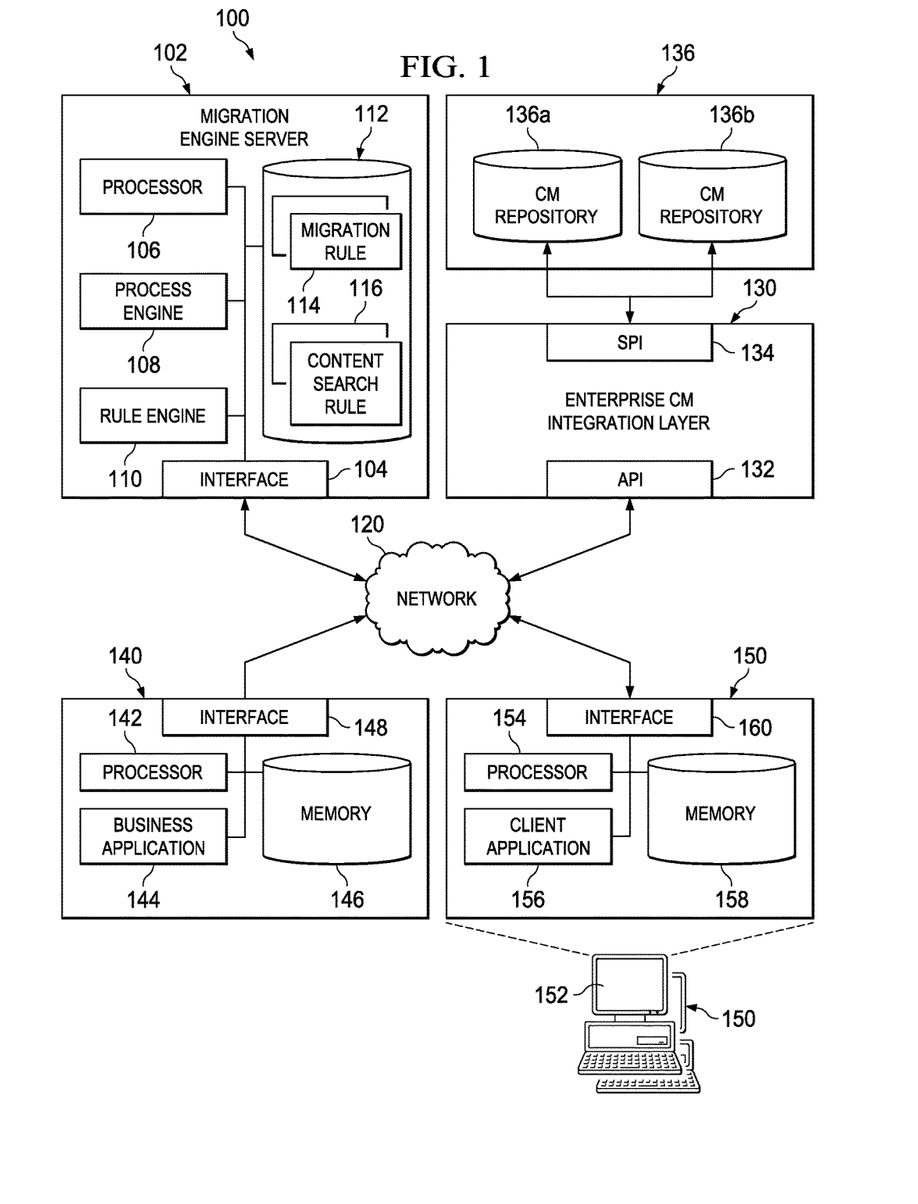
FIG. 1 illustrates an example environment for supporting migration of unstructured data stored in enterprise content management systems.

Turning to the figures, FIG. 1 illustrates an example environment 100 for supporting migration of unstructured data stored in enterprise content management systems in accordance with one implementation of the present disclosure. As used in the present disclosure, the term "structured data" is intended to encompass data organized into an identifiable structure. Examples of structured data may include databases and business objects. As used in the present disclosure, the term "unstructured data" is intended to encompass information that does not have a predefined data model and/or identifiable structure. Examples of unstructured data may include bitmap images, text, emails, and documents. Examples of documents may include text files, word processing files and web pages. As used in the present disclosure, the term "content" refers to unstructured data.

The illustrated environment 100 includes, or is communicably coupled with, a migration engine server 102, a network 120, a content management (CM) layer 130, an ERP system 140, an enterprise CM system 136, and at least one client 150. The migration engine server 102, the CM layer 130, the ERP system 140, the enterprise CM system 136, and the at least one client 150 may communicate across or via network 120. In general, example environment 100 depicts an example configuration of a system for supporting migration of unstructured data stored in the enterprise CM system 136. In alternative implementations, the elements illustrated within the migration engine server 102, the CM layer 130, the ERP system 140, the enterprise CM system 136, and/or the at least one client 150 may be included in or associated with different and/or additional servers, clients, networks, or locations other than those illustrated in FIG. 1. Additionally, the functionality associated with the migration engine server 102 may be associated with any suitable system, including by adding additional instructions, programs, applications, or other software to existing systems. For example, the components illustrated within the migration engine server 102 may be included in multiple servers, cloud-based networks, or other locations accessible to the migration engine server 102 (e.g., either directly or via network 120).

In general, the migration engine server 102 is any server that provides support for migration of unstructured data stored in the enterprise CM system 136 via a process engine 108 and/or a rule engine 110, where the process engine 108 and the rule engine 110 are associated with at least one migration rule 114 instance and at least one content search rule 116 instance. The at least one migration rule 114 instance and the at least one content search rule 116 instance may reside either locally or remote to the migration engine server 102.

For example, each migration engine server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some implementations, other non-Java based servers and or systems could be used for the migration engine server 102. In some implementations, each migration engine server 102 can store and execute a plurality of various other applications (not illustrated), while in other implementations, each migration engine server 102 may be a dedicated server meant to store and execute a particular process engine 108 and/or rule engine 110 and its related functionality. In some implementations, the migration engine server 102 can comprise a Web server or be communicably coupled with a Web server, where the particular process engine 108 and/or rule engine 110 associated with that migration engine server 102 represents a Web-based (or Web-accessible) application accessed and executed on an associated at least one client 150 to perform the programmed tasks or operations of the corresponding process engine 108 and/or rule engine 110. In still other instances, the process engine 108 and/or rule engine 110 may be executed on a first system, while the process engine 108 and/or rule engine 110 manipulates and/or provides information for data located at a remote, second system. In the illustrated example, the process engine 108 and/or rule engine 110 are local to the migration engine server 102 and the enterprise CM system 136 is remote from the migration engine server 102.

At a high level, the migration engine server 102 comprises an electronic computing device operable to receive, transmit, process, store, or manage data and information associated with the example environment 100. The migration engine server 102 illustrated in FIG. 1 can be responsible for receiving application requests from at least one client 150 (as well as any other entity or system interacting with the migration engine server 102), responding to the received requests by processing said requests in an associated process engine 108 and/or rule engine 110, and sending the appropriate responses from the process engine 108 and/or rule engine 110 back to the requesting client 150 or other requesting system. The process engine 108 and/or rule engine 110 can also process and respond to local requests from a user locally accessing the associated migration engine server 102. Accordingly, in addition to requests from the external clients 150 illustrated in FIG. 1, requests associated with a particular process engine 108 and/or rule engine 110 may also be sent from internal users, external or third-party customers, as well as any other appropriate entities, individuals, systems, or computers. In some implementations, the process engine 108 and/or rule engine 110 can be a Web-based application executing functionality associated with the networked or cloud-based business process.

As used in the present disclosure, the term "computer" is intended to encompass any suitable processing device. For example, although FIG. 1 illustrates a single migration engine server 102, example environment 100 can be implemented using any number of servers, as well as computers other than servers, including a server pool. Indeed, the migration engine server 102 may be any computer or processing device such as, for example, a blade server, general-purpose personal computer (PC), Macintosh, workstation, UNIX-based workstation, tablet computer, or any other suitable device. In other words, the present disclosure contemplates computers other than general purpose computers, as well as computers without conventional operating systems. Further, the illustrated migration engine server 102 may be adapted to execute any physical or virtual operating system, including Linux, UNIX, Windows, Mac OS, WebOS, iOS, Android, or any other suitable operating system.

In the illustrated implementation of FIG. 1, the migration engine server 102 includes an interface 104, a processor 106, a process engine 108, a rule engine 110, and a memory 112. While illustrated as a single component in the example environment 100 of FIG. 1, alternative implementations may illustrate the migration engine server 102 as comprising multiple or duplicate parts or portions accordingly.

The interface 104 is used by the migration engine server 102 to communicate with other systems in a client-server or other distributed environment (including within example environment 100) connected to the network 120 (e.g., an associated client 150, as well as other systems communicably coupled to the network 120). FIG. 1 depicts both a server-client environment, but could also represent a cloud-computing network. Various other implementations of the illustrated example environment 100 can be provided to allow for increased flexibility in the underlying system, including multiple migration engine servers 102 performing or executing at least one additional or alternative implementation of the process engine 108 and rule engine 110. In those implementations, the different migration engine servers 102 may communicate with each other via a cloud-based network or through the connections provided by network 120. Returning to the illustrated example environment 100, the interface 104 generally comprises logic encoded in software and/or hardware in a suitable combination and operable to communicate with the network 120. More specifically, the interface 104 may comprise software supporting at least one communication protocol associated with communications such that the network 120 or the interface's hardware is operable to communicate physical signals within and outside of the illustrated example environment 100.

Generally, the migration engine server 102 may be communicably coupled with a network 120 that facilitates wireless or wireline communications between the components of the example environment 100 (i.e., between the migration engine server 102, the CM integration layer 130, the at least one ERP System 140, and the at least one client 150), as well as with any other local or remote computer, such as additional clients, servers, or other devices communicably coupled to network 120, including those not illustrated in FIG. 1. In the illustrated example environment 100, the network 120 is depicted as a single network, but may be comprised of more than one network without departing from the scope of this disclosure, so long as at least a portion of the network 120 may facilitate communications between senders and recipients. In some implementations, at least one component associated with the migration engine server 102 can be included within the network 120 as at least one cloud-based service or operation. The network 120 may be all or a portion of an enterprise or secured network, while in another implementation, at least a portion of the network 120 may represent a connection to the Internet. In some implementations, a portion of the network 120 can be a virtual private network (VPN). Further, all or a portion of the network 120 can comprise either a wireline or wireless link. Example wireless links may include cellular, 802.11a/b/g/n, 802.20, WiMax, and/or any other appropriate wireless link. In other words, the network 120 encompasses any internal or external network, networks, sub-network, or combination thereof operable to facilitate communications between various computing components inside and outside the illustrated example environment 100. The network 120 may communicate, for example, Internet Protocol (IP) packets, Frame Relay frames, Asynchronous Transfer Mode (ATM) cells, voice, video, data, and other suitable information between network addresses. The network 120 may also include at least one local area network (LAN), radio access network (RAN), metropolitan area network (MAN), wide area network (WAN), all or a portion of the Internet, and/or any other communication system or systems in at least one location. The network 120, however, is not a required component in some implementations of the present disclosure.

As illustrated in FIG. 1, the migration engine server 102 includes a processor 106. Although illustrated as a single processor 106 in the migration engine server 102, two or more processors may be used in the migration engine server 102 according to particular needs, desires, or particular implementations of example environment 100. The processor 106 may be a central processing unit (CPU), a blade, an application specific integrated circuit (ASIC), a field-programmable gate array (FPGA), or another suitable component. Generally, the processor 106 executes instructions and manipulates data to perform the operations of the migration engine server 102 and, specifically, the functionality associated with the corresponding process engine 108 and rule engine 110. In one implementation, the migration engine server 102 processor 106 executes the functionality required to also receive and respond to requests and instructions from the at least one ERP system 140 and the at least one client 150.

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, C#, Java, Visual Basic, assembler, Perl, any suitable version of a 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated example environment 100, each processor 106 executes the process engine 108 and rule engine 110 stored on the associated migration engine server 102. In other implementations, a particular migration engine server 102 can be associated with the execution of two or more process engine 108 and/or two or more rule engines 110, as well as at least one distributed application (not illustrated) executing across two or more migration engine servers 102.

A process engine 108 is illustrated within the migration engine server 102. Although illustrated as a single process engine 108 in the migration engine server 102, two or more process engines 108 may be used in the migration engine server 102 according to particular needs, desires, or particular implementations of example environment 100. The process engine 108 can be any application, program, module, process, or other software that may provide methods to schedule, monitor, and audit the migration of unstructured data stored in enterprise CM system 136. In some implementations, a particular process engine 108 can operate in response to and in connection with at least one request received from an associated ERP system 140 or client 150. Additionally, a particular process engine 108 may operate in response to and in connection with at least one request received from other process engines 108 or other rule engines 110, including process engines 108 or rule engines 110 associated with another migration engine server 102. In some implementations, each process engine 108 can represent a Web-based application accessed and executed by remote clients 150 via the network 120 (e.g., through the Internet, or via at least one cloud-based service associated with the process engine 108). For example, a portion of a particular process engine 108 may be a Web service associated with a process engine 108 that is remotely called, while another portion of the particular process engine 108 may be an interface object or agent bundled for processing at a remote client 150. Moreover, any or all of a particular process engine 108 may be a child or sub-module of another software module or enterprise application (not illustrated) without departing from the scope of this disclosure. Still further, portions of the particular process engine 108 may be executed or accessed by a user working directly at the migration engine server 102, as well as remotely at a corresponding client 150. In some implementations, sets made up of migration rules and content search rules can be defined with and stored in the process engine 108.

A rule engine 110 is illustrated within the migration engine server 102. Although illustrated as a single rule engine 110 in the migration engine server 102, two or more rule engines 110 may be used in the migration engine server 102 according to particular needs, desires, or particular implementations of example environment 100. The rule engine 110 can be any application, program, module, process, or other software that may provide methods and a graphical user interface to create, store, and evaluate at least one migration rule 114. The term "Graphical User Interface", or GUI, may be used in the singular or plural to describe at least one GUI and each of the displays of a particular GUI. Therefore, a GUI can be any graphical user interface, such as a generic Web browser, touch screen, or command line interface (CLI) that processes information in the example system 100 and efficiently presents the results to a user. Generally a GUI provides an efficient and user-friendly presentation of data provided by or communicated within the example system 100. In some implementations, a particular rule engine 110 can operate in response to and in connection with at least one request received from an associated ERP system 140 or client 150. Additionally, a particular rule engine 110 may operate in response to and in connection with at least one request received from other rule engines 110 or other process engines 108, including rule engines 110 or process engines 108 associated with another migration engine server 102. In some implementations, each rule engine 110 can represent a Web-based application accessed and executed by remote clients 150 via the network 120 (e.g., through the Internet, or via at least one cloud-based service associated with the rule engine 110). For example, a portion of a particular rule engine 110 may be a Web service associated with a rule engine 110 that is remotely called, while another portion of the particular rule engine 110 may be an interface object or agent bundled for processing at a remote client 150. Moreover, any or all of a particular rule engine 110 may be a child or sub-module of another software module or enterprise application (not illustrated) without departing from the scope of this disclosure. Still further, portions of the particular rule engine 110 may be executed or accessed by a user working directly at the migration engine server 102, as well as remotely at a corresponding client 150.

The migration engine server 102 also includes a memory 112 for storing data and program instructions. The memory 112 may include any memory or database module and may take the form of volatile or non-volatile memory including, without limitation, magnetic media, optical media, random access memory (RAM), read-only memory (ROM), flash memory, removable media, or any other suitable local or remote memory component. The memory 112 may store various objects or data, including classes, frameworks, applications, backup data, business objects, jobs, Web pages, Web page templates, database tables, process contexts, repositories storing services local to the migration engine server 102, and any other appropriate information including any parameters, variables, database queries, algorithms, instructions, rules, constraints, or references thereto associated with the purposes of the migration engine server 102 and its process engine 108 and rule engine 110. In some implementations, including a cloud-based system, some or all of the memory 112 can be stored remote from the migration engine server 102, and communicably coupled to the migration engine server 102 for usage. As illustrated in FIG. 1, memory 112 includes at least one migration rule 114 and at least one content search rule 116.

The at least one migration rule 114 may represent rules, conditions, parameters, variables, algorithms, instructions, constraints, references, and any other appropriate information to define how content is to be migrated within the enterprise CM system 136. In some implementations, the at least one migration rule 114 contains conditions under which metadata associated with matched content is changed and the associated target enterprise CM system 136 repository (e.g., CM repository 136a/136b) for modified matched content to be written to. For example, the at least one migration rule 114 may specify that any matched content with a company code of "COM0001" is to be modified to reflect company code "COM0002" and written to a specifically identified target CM repository within the enterprise CM system 136. Further, the at least one migration rule may also specify that any matched document with a company code of "COM0001" is to be deleted from a source CM repository once it is copied to the specifically identified target CM repository. In some implementations, the at least one migration rule 114 is stored locally with the migration engine server 102. In other implementations, the at least one migration rule 114 can be stored remotely from the migration engine server 102 as long as the at least one migration rule 114 is accessible by the migration engine server 102. The at least one migration rule 114 may be accessed, for example, via a Web service, a remote access system or software, a local or remote client 150, or other suitable system component.

The at least one content search rule 116 may represent rules, criteria conditions, parameters, variables, algorithms, instructions, constraints, references, queries, and any other appropriate information to define how content is searched for within the enterprise CM system 136. For example, search criteria considered relevant in the at least one content search rule 116 may include a company code (e.g., "COM0001"), a document identification number (e.g., "D0000047"), a document title (e.g., "Sales Order for Widget XYX"), involved CM repositories in the enterprise CM system 136 (e.g., "CM Repository 1"), a document type (e.g., "txt"), or other suitable search criteria. In some implementations, the at least one content search rule 116 may be any query consumed by an enterprise CM integration (ECMI) layer application programming interface (API). In some implementations, the at least one content search rule 116 may be a boolean or regular expression combined by boolean operators. For example, a content search rule could be structured similar to "company=001 AND doctype=*.txt." In some implementations, the at least one content search rule 116 can be stored remotely from the migration engine server 102. The at least one content search rule 116 may be accessed, for example, via a Web service, a remote access system or software, a local or remote client 150, or other suitable system component. In some implementations, the process engine 108 transfers the at least one content search rule 116 to a query API of the ECMI layer 130 which processes the at least one content search rule 116. In some implementations, an additional hardware and/or software component (not illustrated) which converts a generic content search rule 116 into a specific ECMI layer query (not illustrated) in order to allow the use of ECMI layers of varying types can integrated with or accessible to the migration engine server 102.

The ECMI layer 130 allows various components of the example environment 100 to connect to the enterprise CM system 136 via a provided service provider interface (SPI) 134. The ECMI layer 130 also exposes the enterprise CM system 136 to applications through a unified API. The API provides methods to manipulate (e.g., read, write, and delete) content and metadata associated with the enterprise CM system 136. For example, API 132 and SPI 134 of ECMI layer 130 may allow process engine 108, rule engine 110, business application 144, and client application 150, or other suitable hardware and/or software components (not illustrated) to manipulate content on CM repositories 136a/136b of the enterprise CM system 136. While illustrated as a stand-alone component in the example environment 100 of FIG. 1, alternative implementations may illustrate the ECMI layer 130 as integrated with other components of example environment 100 (e.g., migration engine server 102, ERP system 140). Moreover, any or all parts of the ECMI layer 130 may be implemented as child or sub-modules of another software module or enterprise application (not illustrated) or of another hardware module (not illustrated) without departing from the scope of this disclosure.

Enterprise CM system 136 provides a collection of storage, retrieval, and modification procedures used to manage content in a collaborative environment. The enterprise CM system 136 may manage an organization's unstructured data, streamline access to the unstructured data, optimize security, and maintain integrity of the unstructured data. While illustrated as a single component in the example environment 100 of FIG. 1, alternative implementations may illustrate the enterprise CM system 136 as comprising multiple or duplicate parts or portions accordingly. Alternative implementations may illustrate the enterprise CM system 136 as integrated with other components of example environment 100 (e.g., migration engine server 102, ERP system 140). Moreover, any or all parts of the enterprise CM system 136 may be implemented as child or sub-modules of another software module or enterprise application (not illustrated) or of another hardware module (not illustrated) without departing from the scope of this disclosure. As illustrated in FIG. 1, enterprise CM system 136 includes CM repository 136a and CM repository 136b. In alternate implementations, enterprise CM system 136 may comprise one or multiple CM repositories. CM repositories may reside locally or remote to any other CM repositories. The CM repositories may include any memory or database module and may take the form of physical/virtual and volatile/non-volatile memory including, without limitation, magnetic media, optical media, random access memory (RAM), read-only memory (ROM), removable media, or any other suitable local or remote memory component.

ERP system 140 integrates internal and external management information across an entire organization and enables the flow of information between all business functions inside boundaries of the organization and manages connections to outside stakeholders to the organization. While illustrated as a single component in the example environment 100 of FIG. 1, alternative implementations may illustrate the ERP system 140 as comprising multiple or duplicate parts or portions accordingly. At a high level, each ERP system 140 can include a processor 142, a business application 144, a memory 146, and an interface 148. In general, the ERP system 140 comprises at least one electronic computer device operable to receive, transmit, process, and/or store any appropriate data associated with a migration engine server 102 or other suitable data source. While example environment 100 is illustrated as containing an ERP system 140, in alternative embodiments, example environment 100 may be implemented with any other type of system integrated with a CM system.

In some implementations, processor 142 can be similar to processor 106 of the migration engine server 102. In other implementations, the processor 142 may be a processor designed specifically for use in ERP system 140. Further, although illustrated as a single processor 142, the processor 142 may be implemented as multiple processors in the ERP system 140. Regardless of the type and number, the processor 142 executes instructions and manipulates data to perform the operations of the ERP system 140, including operations to receive and process information from the migration engine server 102 or other suitable data source, access data within memory 146, execute the business application 144, as well as perform other operations associated with the ERP system 140.

At least one business application 144 is illustrated within the ERP system 140. The business application 144 can be any application, program, module, process, or other software that may execute, change, delete, generate, or otherwise manage information associated with a particular ERP system 140, and in some cases, a business process performing and executing business process-related events. In particular, business processes communicate with other users, applications, systems, and components to send and receive events. In some implementations, a particular business application 144 can operate in response to and in connection with at least one request received from an associated client 150. Additionally, a particular business application 144 may operate in response to and in connection with at least one request received from other business applications 144, including a business application 144 associated with another ERP system 140. In some implementations, each business application 144 can represent a Web-based application accessed and executed by remote clients 150 via the network 120 (e.g., through the Internet, or via at least one cloud-based service associated with the business application 144). For example, a portion of a particular business application 144 may be a Web service associated with the business application 144 that is remotely called, while another portion of the business application 144 may be an interface object or agent bundled for processing at a remote client 150. Moreover, any or all of a particular business application 144 may be a child or sub-module of another software module or enterprise application (not illustrated) without departing from the scope of this disclosure. Still further, portions of the particular business application 144 may be executed or accessed by a user working directly at the ERP system 140, as well as remotely at a corresponding client 150. In some implementations, the migration engine server 102 can execute the business application 144. In some implementations, the business application 144 can execute the process engine 108 and/or the rule engine 110 directly from the ERP system 140 or via a client 150 accessing the business application 144.

Memory 146 of the ERP system 140 may include any memory or database module and may take the form of volatile or non-volatile memory including, without limitation, magnetic media, optical media, random access memory (RAM), read-only memory (ROM), removable media, or any other suitable local or remote memory component. For example, memory 146 may store a business application 144, backup data, parameters, cookies, variables, algorithms, instruction, rules, or reference thereto. As illustrated, memory 146 can include any suitable components to interpret and decode messages received at the ERP system 140. Further, although illustrated as a single memory 146, the memory 146 may be implemented as multiple memories in the ERP system 140. The memory 146 may also store at least one migration rule (not illustrated) and an at least one content search rule (not illustrated) similar to the at least one migration rule 114 and the at least one content search rule 116, respectively stored in memory 112.

The interface 148 of the ERP system 140 may be similar to the interface 104 of the migration engine server 102, in that it may comprise logic encoded in software and/or hardware in a suitable combination and operable to communicate with the network 120. More specifically, interface 148 may comprise software supporting at least one communication protocol such that the network 120 or hardware is operable to communicate physical signals to and from the ERP system 140. Further, although illustrated as a single interface 148, the interface 148 may be implemented as multiple interfaces in the ERP system 140.

In general, a client 150 is any computer device operable to connect or communicate with migration engine server 102 using a wireless or wireline connection (i.e., network 120). In particular, the client 150 may be embodied as a mobile or non-mobile computing device. At a high level, each client 150 can include a processor 154, a GUI 152, a client application 156, a memory 158, and an interface 160. In general, the client 150 comprises an electronic computer device operable to receive, transmit, process, and/or store any appropriate data associated with a migration engine server 102 or other suitable data source.

The GUI 152 of the client 150 is operable to allow the user of the client 150 to interface with at least a portion of the system 100 for any suitable purpose, including to allow a user of the client 150 to interact with at least one client application 156, business application 144, and the process engine 108 and/or rule engine 110. In particular, the GUI 152 may provide users of the client 150 with a visualized representation of the client application 156, business application 144, process engine 108 and/or rule engine 110, and other client 150 functionality. The GUI 152 may include a plurality of user interface elements such as interactive fields, pull-down lists, buttons, and other suitable user interface elements operable at the client 150.

In some implementations, processor 154 can be similar to processor 106 of the migration engine server 102 or to the processor 142 of ERP system 140. In other implementations, the processor 154 may be a processor designed specifically for use in client 150. Further, although illustrated as a single processor 154, the processor 154 may be implemented as multiple processors in the client 150. Regardless of the type and number, the processor 154 executes instructions and manipulates data to perform the operations of the client 150, including operations to receive and process information from the migration engine server 102 or other suitable data source, access data within memory 158, execute the client application 156, as well as perform other operations associated with the client 150.

The client application 156 of the client 150 may retrieve application-related information from a corresponding migration engine server 102, or the client application 156 may access a local cached set of client-application-related information (not illustrated) stored on the client 150. In some implementations, the client application may retrieve application-related information from a corresponding ERP system 140. In some implementations, the client application 156 can be a Web browser. In some implementations, the client-application 156 can use parameters, metadata, and other information received at launch to access a particular set of data from the migration engine server 102. Once a particular client application 156 is launched, a user may interactively process a task, event, or other information associated with the migration engine server 102. Further, although illustrated as a single client application 156, the client application 156 may be implemented as multiple client applications in the client 150.

Similarly, memory 158 of the client 150 may include any memory or database module and may take the form of volatile or non-volatile memory including, without limitation, magnetic media, optical media, random access memory (RAM), read-only memory (ROM), removable media, or any other suitable local or remote memory component. For example, memory 158 may store a client application 156, backup data, parameters, cookies, variables, algorithms, instruction, rules, or reference thereto. As illustrated, memory 158 can include any suitable components to interpret and decode messages received at the client 150. Further, although illustrated as a single memory 158, the memory 158 may be implemented as multiple memories in the client 150. The memory 158 may also store at least one migration rule (not illustrated) and an at least one content search rule (not illustrated) similar to the at least one migration rule 114 and the at least one content search rule 116, respectively stored in memory 112.

The interface 160 of the client 150 may be similar to the interface 104 of the migration engine server 102 or to the interface 148 of ERP system 140, in that it may comprise logic encoded in software and/or hardware in a suitable combination and operable to communicate with the network 120. More specifically, interface 160 may comprise software supporting at least one communication protocol such that the network 120 or hardware is operable to communicate physical signals to and from the client 150. Further, although illustrated as a single interface 160, the interface 160 may be implemented as multiple interfaces in the client 150.

While FIG. 1 is described as containing or being associated with a plurality of components, not all components illustrated within the illustrated implementation of FIG. 1 may be utilized in each implementation of the present disclosure. Additionally, at least one component described herein may be located external to example environment 100, while in other implementations, certain components may be included within or as a portion of at least one described component, as well as other components not described. Further, certain components illustrated in FIG. 1 may be combined with other components, as well as used for alternative or additional purposes, in addition to those purposes described herein.

Figure 2A:
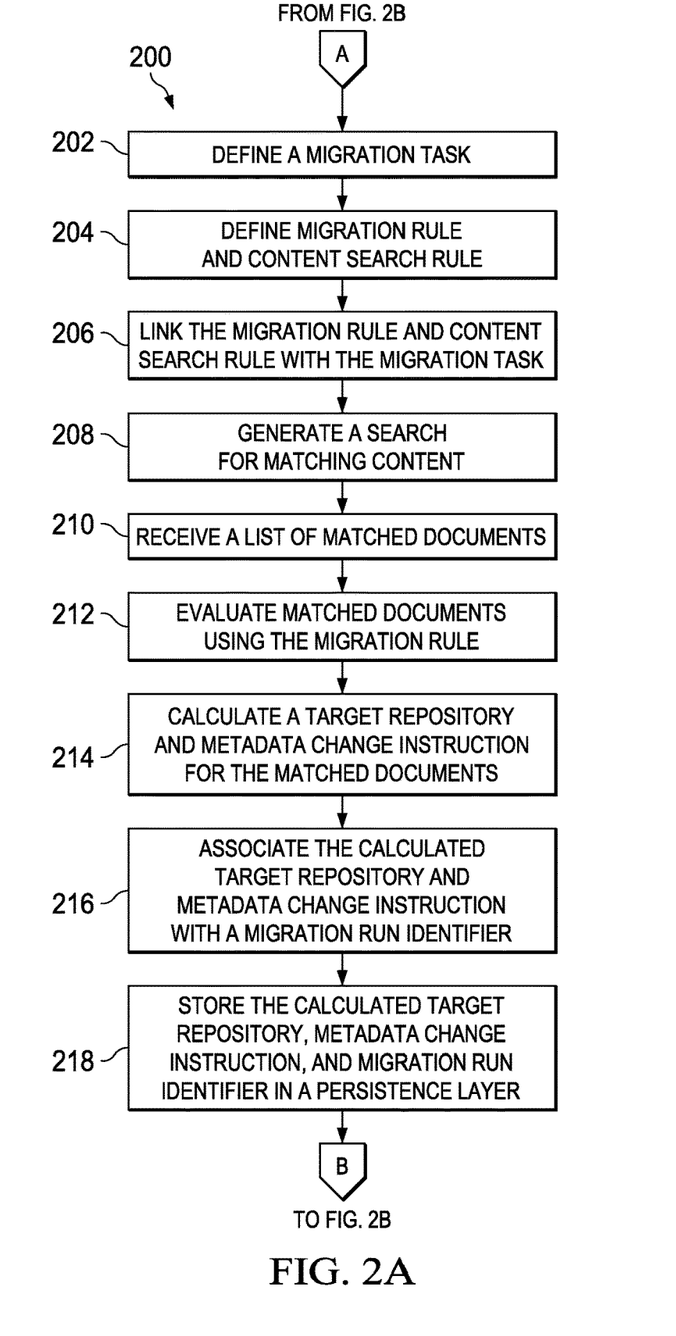
FIGS. 2A & 2B are flowcharts of an example method for supporting migration of unstructured data stored in enterprise content management systems.

FIG. 2A illustrates a flowchart of an example method 200 for supporting migration of unstructured data stored in an enterprise CM system using a migration engine. For clarity of presentation, the description that follows generally describes method 200 in the context of example environment 100 illustrated in FIG. 1. However, it will be understood that method 200 may be performed, for example, by any other suitable system, environment, or combination of systems and environments, as appropriate.

Referring now to FIG. 2A, method 200 begins at 202. At 202, a migration task is defined. In some implementations, a unique migration task identifier is associated with the defined migration task. The unique migration task identifier may be, for example, a globally unique identifier (GUID), a result from a hash function, a checksum, or other suitable unique identifier. From 202, method 200 proceeds to 204.

At 204, a migration rule is defined. In some implementations, a unique migration rule identifier is associated with the defined migration rule. The unique migration task identifier may be, for example, a globally unique identifier (GUID), a result from a hash function, a checksum, or other suitable unique identifier. Further, a content search rule is defined. In some implementations, a unique content search rule identifier is associated with the defined content search rule. The unique migration task identifier may be, for example, a globally unique identifier (GUID), a result from a hash function, a checksum, or other suitable unique identifier. In some implementations, a GUI is provided by the rule engine of the migration engine server which allows the definition of the migration rule and/or the content search rule. From 204, method 200 proceeds to 206.

At 206, the migration rule and the content search rule are linked with the migration task. In some implementations, the linking is accomplished by associating the unique migration rule identifier and the unique content search rule identifier with the unique migration task identifier. In some implementations, the linking can be performed within a database, a file, a variable or using a flag or other suitable method to associate the migration rule, content search rule, and migration task. From 206, method 200 proceeds to 208.

At 208, a search for matching content within the enterprise CM system is generated using the defined content search rule. In some implementations, the process engine executes the search for matching content. In some implementations, search criteria associate with the content search rule is passed to a search interface in the ECMI layer API. From 208, method 200 proceeds to 210

At 210, a list is returned of matched documents satisfying the applied content search rule. In some implementations, the list is returned via the search interface in the ECMI layer API. In some implementations, each document in the list of matched documents is associated with at least a source repository identifier and a unique document identifier. The unique document identifier and the source repository identifier may be, for example, a globally unique identifier (GUID), a result from a hash function, a checksum, or other suitable unique identifier. From 210, method 200 proceeds to 212.

At 212, the document associated with each unique document identifier in the returned list of matched documents is evaluated using the migration rule. In some implementations, the evaluation is performed by the process engine. From 212, method 200 proceeds to 214.

At 214, a target repository identifier and at least one metadata change instruction is calculated for each unique document identifier in the returned list of matched documents using the at least one migration rule. In some implementations, the calculation is performed by the process engine. From 214, method 200 proceeds to 216.

At 216, the calculated target repository identifier and the at least one metadata change instruction for each unique document identifier in the returned list of matched documents is associated with a unique migration run identifier. In some implementations, the association is performed by the process engine. From 216, method 200 proceeds to 218.

At 218, the calculated target repository identifier and the at least one metadata change instruction for each unique document identifier in the returned list of matched documents is stored in a persistence layer with the unique migration run identifier. In some implementations, the storage is performed by the process engine on the migration engine server 102. In some implementations, the calculated target repository identifier and the at least one metadata change instruction for each unique document identifier in the returned list of matched documents can be stored remotely from the migration engine server 102. The calculated target repository identifier and the at least one metadata change instruction for each unique document identifier in the returned list of matched documents may be accessed, for example, via a Web service, a remote access system or software, or other suitable system component. From 218, method 200 proceeds to 220.

At 220 (referring now to FIG. 2B), a copy of the document associated with each unique document identifier in the returned list of matched documents is created, thereby creating copied source documents. In some implementations, the copy is made within the source repository. In some implementations, the copied source documents can be stored remote from the source repository. The copied source documents can be accessed, for example, via a Web service, a remote access system or software, or other suitable system component. From 220, method 200 proceeds to 222.

Figure 2B:
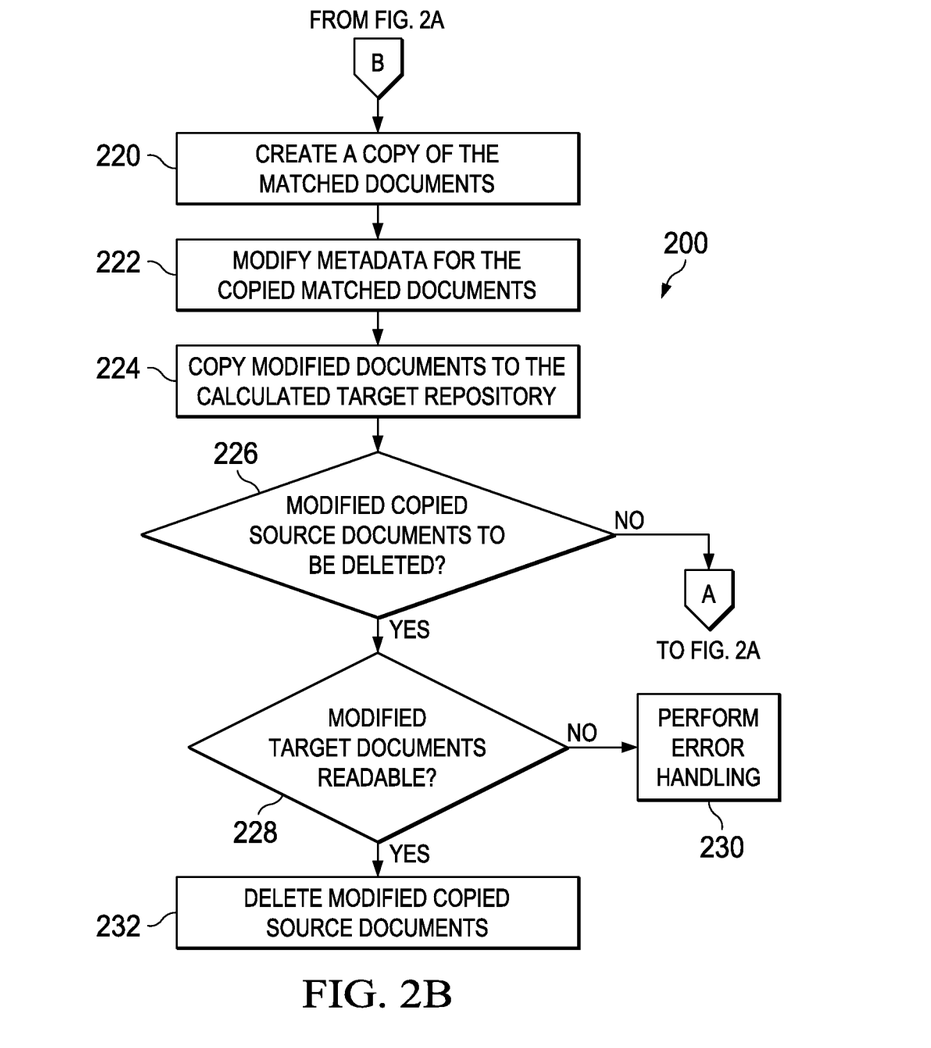

At 222, metadata for the copied source documents is modified using the at least one metadata change instruction, thereby creating modified copied source documents. In some implementations, the modification is performed by the process engine. From 222, method 200 proceeds to 224.

At 224, the modified copied source documents are copied to the calculated target repository, thereby creating modified target documents. In some implementations, the copying is performed by the process engine. From 224, method 200 proceeds to 226.

At 226, a determination is made whether the modified copied source documents are to be deleted. Responsive to a determination that the modified copied source documents are not to be deleted, the method 200 then proceeds to 202 or to some other point in the process flow. Responsive to a determination that the modified copied source documents are to be deleted, the method 200 proceeds to 228.

At 228, a determination is made whether the modified target documents are readable. Responsive to a determination that the modified target documents are not readable, the method 200 proceeds to 230. At 230, error handling is performed. The error handling may include, for example, notifying the user, generating an error message or code, terminating the migration process, or some other suitable error handling method. From 230, method 200 may proceed to 202 or to some other point in the process flow or method 200 may end. Responsive to a determination that modified target documents are readable, method 200 proceeds to 232. At 232, the modified copied source documents are deleted. From 232, method 200 ends.

The preceding figures and accompanying description illustrate example processes and computer implementable techniques. But example environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the steps in these processes may take place simultaneously, concurrently, in parallel, and/or in different orders than as shown. Moreover, example environment 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method for supporting migration of unstructured data stored in enterprise content management systems, comprising:

generating a search for the unstructured data matching at least one content search rule, the unstructured data comprising information that does not have a predefined data model, the at least one content search rule comprising an enterprise identifier and a document identifier and the at least one content search rule being retrieved from a migration engine server configured to provide support for migration of the unstructured data and structured data stored in an enterprise resource planning system;

receiving a list of matched documents, wherein each document in the list of matched documents comprises at least a portion of the unstructured data and is associated with at least a source repository identifier and a unique document identifier;

calculating a target repository identifier and at least one metadata change instruction for each unique document identifier using at least one migration rule defining how the unstructured data is to be migrated to maintain an integrity of the unstructured data, the at least one migration rule being compliant with international regulations; and modifying metadata for the document associated with the document identifier using the calculated at least one metadata change instruction to generate a modified copy of the document, the at least one metadata change instruction specifying that any matched content with a particular source repository identifier is to be modified to reflect a particular target repository identifier, the particular target repository identifier comprising at least one of a prefix and a suffix different from the particular source repository identifier and the at least one metadata change instruction specifying deletion of the metadata matching the particular source repository identifier from a source repository associated with the particular source repository identifier upon migration to a target repository associated with the particular target repository identifier.

2. The computer-implemented method of claim 1, wherein the at least one content search rule is associated with a unique content search identifier.

3. The computer-implemented method of claim 1, wherein the at least one migration rule is associated with a unique migration rule identifier.

4. The computer-implemented method of claim 1, further comprising linking the at least one migration rule and the at least one content search rule with a unique migration task identifier.

5. The computer-implemented method of claim 1, further comprising, associating the calculated target repository identifier and the at least one metadata change instruction for each unique document identifier with a unique migration run identifier.

6. The computer-implemented method of claim 5, further comprising storing the calculated target repository identifier, the at least one metadata change instruction, and the unique migration run identifier in a persistence layer.

7. The computer-implemented method of claim 1, wherein the modified metadata for the document is copied to a calculated target repository associated with the target repository identifier.

8. The computer-implemented method of claim 1, further comprising deleting the modified metadata for the document from the source repository associated with the source repository identifier if the target repository identifier is different than the source repository identifier.

9. The computer-implemented method of claim 8, wherein the modified metadata for the document is verified as readable prior to deletion from the source repository.

10. A computer-program product for supporting migration of unstructured data stored in enterprise content management systems, the computer-program product comprising computer-readable instructions embodied on tangible, non-transitory media, the instructions operable when executed to:
generate a search for the unstructured data matching at least one content search rule, the unstructured data comprising information that does not have a predefined data model, the at least one content search rule comprising an enterprise identifier and a document identifier and the at least one content search rule being retrieved from a migration engine server configured to provide support for migration of the unstructured data and structured data stored in an enterprise resource planning system;
receive a list of matched documents, wherein each document in the list of matched documents comprises at least a portion of the unstructured data and is associated with at least a source repository identifier and a unique document identifier;
calculate a target repository identifier and at least one metadata change instruction for each unique document identifier using at least one migration rule defining how the unstructured data is to be migrated to maintain an integrity of the unstructured data, the at least one migration rule being compliant with international regulations; and
modify metadata for the document associated with the document identifier using the calculated at least one metadata change instruction to generate a modified copy of the document, the at least one metadata change instruction specifying that any matched content with a particular source repository identifier is to be modified to reflect a particular target repository identifier, the particular target repository identifier comprising at least one of a prefix and a suffix different from the particular source repository identifier and the at least one metadata change instruction specifying deletion of the metadata matching the particular source repository identifier from a source repository associated with the particular source repository identifier upon migration to a target repository associated with the particular target repository identifier.

11. The computer-program product of claim 10, the instructions further operable when executed to associate the calculated target repository identifier and the at least one metadata change instruction for each unique document identifier with a unique migration run identifier.

12. The computer-program product of claim 10, the instructions further operable when executed to delete the modified metadata for the document from the source repository associated with the source repository identifier if the target repository identifier is different than the source repository identifier.

13. The computer-program product of claim 12, wherein the modified metadata for the document is verified as readable prior to deletion from the source repository.

14. A system for supporting migration of unstructured data stored in enterprise content management systems, comprising:
memory operable to store unstructured data; and
at least one hardware processor interoperably coupled to the memory and operable to:
generate a search for the unstructured data matching at least one content search rule, the unstructured data comprising information that does not have a predefined data model, the at least one content search rule comprising an enterprise identifier and a document identifier and the at least one content search rule being retrieved from a migration engine server configured to provide support for migration of the unstructured data and structured data stored in an enterprise resource planning system;
receive a list of matched documents, wherein each document in the list of matched documents comprises at least a portion of the unstructured data and is associated with at least a source repository identifier and a unique document identifier;
calculate a target repository identifier and at least one metadata change instruction for each unique document identifier using at least one migration rule defining how the unstructured data is to be migrated to maintain an integrity of the unstructured data, the at least one migration rule being compliant with international regulations; and
modify metadata for the document associated with the document identifier using the calculated at least one metadata change instruction to generate a modified copy of the document, the at least one metadata change instruction specifying that any matched content with a particular source repository identifier is to be modified to reflect a particular target repository identifier, the particular target repository identifier comprising at least one of a prefix and a suffix different from the particular source repository identifier and the at least one metadata change instruction specifying deletion of the metadata matching the particular source repository identifier from a source repository associated with the particular source repository identifier upon migration to a target repository associated with the particular target repository identifier.

15. The system of claim 14, the at least one hardware processor further operable to associate the calculated target repository identifier and the at least one metadata change instruction for each unique document identifier with a unique migration run identifier.

16. The system of claim 14, the at least one hardware processor further operable to delete the modified metadata for the document from the source repository associated with the source repository identifier if the target repository identifier is different than the source repository identifier.

17. The system of claim 16, wherein the modified metadata for the document is verified as readable prior to deletion from the source repository.

* * * * *